US008457096B2

(12) United States Patent
Le Bars et al.

(10) Patent No.: US 8,457,096 B2
(45) Date of Patent: Jun. 4, 2013

(54) BEAM STEERING IN A MESH NETWORK WITH REPETITIONS

(75) Inventors: Philippe Le Bars, Thorigne-Fouillard (FR); Brice Le Houerou, Acigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 387 days.

(21) Appl. No.: 12/626,730

(22) Filed: Nov. 27, 2009

(65) Prior Publication Data

US 2010/0128713 A1 May 27, 2010

(30) Foreign Application Priority Data

Nov. 27, 2008 (FR) ................................. 08 58069

(51) Int. Cl.
*H04B 7/212* (2006.01)
(52) U.S. Cl.
USPC .......................................................... 370/347
(58) Field of Classification Search
None
See application file for complete search history.

(56) References Cited

U.S. PATENT DOCUMENTS

| 5,892,770 | A * | 4/1999 | Wolf et al. ..................... 370/468 |
| 6,249,250 | B1 | 6/2001 | Namekata et al. |
| 7,039,120 | B1 | 5/2006 | Thoumy et al. |
| 7,206,356 | B2 | 4/2007 | Le Bars et al. |
| 7,596,186 | B2 | 9/2009 | Le Bars |
| 2005/0153721 | A1 * | 7/2005 | Chang ........................... 455/502 |
| 2006/0083328 | A1 * | 4/2006 | Green et al. ................... 375/295 |
| 2008/0012748 | A1 * | 1/2008 | Ahn ................................ 342/21 |
| 2008/0225965 | A1 * | 9/2008 | Pi et al. .......................... 375/260 |
| 2009/0051594 | A1 * | 2/2009 | Na et al. ......................... 342/373 |
| 2009/0058724 | A1 * | 3/2009 | Xia et al. ....................... 342/368 |

FOREIGN PATENT DOCUMENTS

WO 2008/152566 A1 12/2008

OTHER PUBLICATIONS

U.S. Appl. No. 12/626,741, filed Nov. 27, 2009. Applicants: Pascal Lagrange, et al.
Ji-Yong Park, et al., "A 60 GHz Integrated Antenna Array for High-Speed Digital Beamforming Applications", IEEE MTT-S Digest, 2003, pp. 1677-1680.
Frank B. Gross, "Smart Antennas for Wireless Communications", 2005, pp. 209-233.
John Terry, et al., "OFDM Wireless LANs: A Theoretical and Practical Guide", 2002.
French Search Report dated Jul. 31, 2009 in corresponding FR 0858069.

* cited by examiner

*Primary Examiner* — John Blanton
(74) *Attorney, Agent, or Firm* — Fitzpatrick, Cella, Harper & Scinto

(57) ABSTRACT

The device for steering a beamforming antenna (500) comprises a module (511) for calculating antenna steering coefficients and a repetition detection module (516, 517) adapted to detect the repetition of a sequence of payload data in the signal received by said antenna. The module for calculating antenna steering coefficients is adapted to calculate said coefficients on the basis of the signals received by the antenna at the time of said repetition.
In particular embodiments, the device further comprises an OFDM wireless receiver (501 to 503) and the module for calculating antenna steering coefficients employs each subcarrier of the signal received by the antenna.

18 Claims, 4 Drawing Sheets

BEAM STEERING IN A MESH NETWORK WITH REPETITIONS

Figure 1:
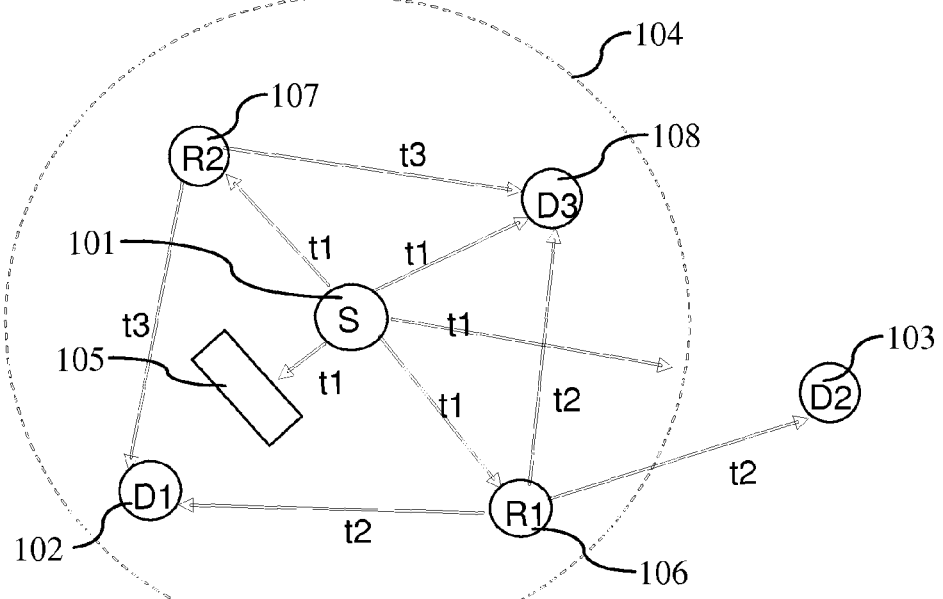

The present invention concerns a method and device for antenna steering and, particularly, the adjustment of the antenna beam of a node in a mesh network. The invention is, in particular, intended for use in a data transport network using high frequencies, typically of the order of 60 GHz. At these frequencies, electromagnetic signals have a behavior close to that of light, therefore requiring direct transmission free of reflection, referred to as "line of sight" transmission. The propagation of these waves is marked by a fast attenuation of the signal power. To obtain a sufficient signal-to-noise ratio at the receiver, antennae techniques have been envisaged such as the combination of multiple receiving antennae, as well as the use of relays to reach receivers that are too remote.

The technical field of the present invention covers that of the management of antennae, in particular for multimedia communication networks with high throughput, in which the information transmission capacity of the network depends on the gain provided by the antenna. It is to be recalled here that the gain of an antenna is a definition relative to an isotropic emitting element. More particularly, an antenna is in principle a passive element, and it is thus not a matter here of amplifying a signal. On the other hand, when the radiation is no longer isotropic, some regions of space may receive more energy than other regions. The gain of an antenna is thus defined as the power received by the region where the maximum energy is concentrated relative to the energy that an isotropic antenna would have emitted in that region. Clearly, if some regions of space receive more energy, there are necessarily regions which only receive low energy. For reception, the electromagnetic symmetry of an antenna is considered and the same definitions apply.

The more an antenna is directive, the greater the gain it provides. Correlatively, the narrower the beam the more precise the steering must be. The signal-to-noise ratio is greater when the steering is precise, and the quality of reception is thus improved. It is then possible to use a system of modulation with an alphabet of symbols that is richer but more sensitive to noise. It is to be recalled here that, in OFDM modulation (OFDM being an acronym for "Orthogonal Frequency Division Multiplexing"), the set of modulation states of the sub-carriers is termed an "OFDM symbol".

OFDM modulation is a modulation of digital signals by distribution into orthogonal frequencies that is used, among others, for mobile transmission systems with a high data throughput. With OFDM modulation, the distribution of the energy into multiple sub-carriers makes steering all the more complicated. Steering which improves the reception of the low frequency subcarriers may disturb the quality of the high frequency subcarriers. A compromise must be found to take all the sub-carriers into account for steering.

Beamforming antennae are well known to the person skilled in the art. The principle of the beamforming antenna is to use an array of elementary antennae (or antenna elements). For the beamforming of an antenna:

either the elementary antennae are pointed in various directions and the right antenna is chosen using switches, or the signal coming from each elementary antenna is demodulated, and it is then necessary to vary the amplitude and phase of the signals coming out from each element using a signal performing multiplication with the signal collected by the antenna, before adding all the resulting signals, or a combination of the above two methods is used.

The document by J. Y. Park, Y. Wang, T. Itoh, "A 60 GHz Integrated Antenna Array for High-Speed Digital Beamforming Applications", IEEE MTT-S International Microwave Symposium. Philadelphia, Pa. 7-13 Jun. 2003, pages 1677 to 1680, states how such an antenna may be produced at 60 GHz.

Primitive systems of antenna arrays can be found on the first Radio-Navigation devices of around 1937. MUSIC (acronym for Multiple Signal Classification) in 1986 and ESPRIT (acronym for Estimation of Signal Parameters via Rotational Invariance Techniques) in 1989, are well-known algorithms for determining the direction of a received signal which may possibly enable the steering of the antenna to be calculated.

For the steering of an antenna for which the direction of arrival of the signal is known beforehand, numerous methods for setting the beamforming antenna exist in the prior art. Their classification depends on the criterion used. This criterion may for example be one of the following:

maximization of the signal/interference ratio, minimization of the variance of the received signal, minimization of the least error squares, maximum plausibility, minimization of the error rate per sub-carrier, interest of the signal and compensation for movement of the transmitter or the receiver.

In the document by F. Gross, "Smart Antennas for Wireless Communications", McGraw-Hill 2005, pages 212 to 231, references are to be found for each of these methods, that are not particularly adapted to OFDM.

For the specific problem of OFDM, the U.S. Pat. No. 6,249,250 to M. Namekata determines the coefficients for the antennae by an extrapolation based on the frequential distance between sub-carriers from results collected in relation to a sub-carrier. A drawback of this method is that it is predictive for some sub-carriers. Consequently, it may occur that the optimum coefficients providing good reception for all the sub-carriers are not obtained.

Steering methods are known which are based on a calculation involving a difference between the received signal and the signal hoped for, in general, a training sequence known both to the transmitter and to the receiver. A drawback of this sequence is that it occupies bandwidth without transporting information. For this reason, this sequence is in general very short. It is placed at the frame start. The calculation of the steering coefficients for the antenna is thus carried out during reception of that sequence. As this time is limited, the steering algorithm can only achieve course steering.

The present invention aims to solve this problem advantageously.

To that end, according to a first aspect, the present invention is directed to a steering device for a beamforming antenna, comprising a module for calculating antenna steering coefficients, characterized in that it further comprises a repetition detection module adapted to detect the repetition of a sequence of payload data in the signal received by said antenna, the module for calculating antenna steering coefficients being adapted to calculate said coefficients on the basis of the signals received by the antenna at the time of said repetition.

The use of a training sequence is thus avoided and the rate of payload data is thus increased.

The implementation of the present invention makes it possible to improve the information transmission capacity of the radio link by the precision of the steering of the antennae beams in a network and by combination of the signals coming from the reception from the same transmitter by several transmitter antennae.

As the repeated sequence is generally longer than a training sequence, the precision of the steering obtained is better than when the steering is carried out on the basis of a training sequence.

Consequently, for an OFDM transmission, the non-repeated parts of the messages received after the first message benefit from a higher transmission speed, supported by a richer symbol alphabet.

The invention also takes advantage, in particular, of a property of a mesh network with repetitions. In this particular network, relay nodes re-transmit a message or a part thereof that has been received. The object may be to act against the message losses which are caused by obstructions in the line of sight between the transmitter and receiver. To be precise, at 60 GHz, beyond a certain distance, communication can only be established in a direct line of sight, with high gain antennae, the reflections being of too low power to be exploited. The recipient node may thus receive signals directly from the source node and from one or more relay nodes.

The object may also be to reach a node which is too far from a source node to observe sufficient received signal power. A relay will enable communication to be reestablished. To enable good reception, a mode of access to the medium is defined, for example such as Time Division Multiplex (TDM) access.

The particularity of the mesh network is that a message may be relayed, either to reach a node which is too far to receive the message from the source node, or for reasons of protection against packet losses. The nodes which are close to the source node such as the relay node will then receive message repetitions. In TDM access, the speaking order of the nodes is defined, thus as soon as a receiver has been synchronized it can determine whether the data it is receiving at a particular time are new elements or form part of a repetition.

When conditions are optimal, in a mesh network, the receiver node thus receives a certain number of repetitions of the same message, these repetitions coming from different relay nodes and thus from several directions. FIG. 1 illustrates this effect. At time t1, the central node S 101 transmits a signal which neither reaches node D1 102, since there is an obstacle 105 on the path, nor node D2 103, since it is out of range (the range of the central node 101 is represented by a circle 104 in dashed line). At time t2, node R1 106 relays the signal. At time t3, node R2 107 relays the signal. Node D1 102 then receives two messages, node D2 103 receives one and node D3 108 receives three.

The receiver node must successively set its antenna in each direction, and obtain the best possible antenna gain in each direction. The invention provides a system which exploits message redundancy to set the gain and the directivity of the antenna.

According to particular features, the device of the present invention, as succinctly set forth above, further comprises a wireless receiver implementing orthogonal frequency division multiplexing making it possible to have a plurality of sub-carriers.

It is noted that, for the case of OFDM, a temporal sequence with high self-correlation makes it possible to create a synchronization signal at the receiver, even in the presence of high noise power.

According to particular features, the module for calculating antenna steering coefficients takes into account each sub-carrier of the signal received by the antenna.

According to particular features, the module for calculating antenna steering coefficients determines an inverse Fourier transform, in the form of a vector $d(kT)$, of the current steering coefficients forming a vector $C(kT)$ and determines an error signal $e(kT)$ according to the vector formula:

$$e(kT) = d(kT) - C^H(kT)X(kT)$$

where $C^H(kT)$ indicates the Hilbertian transpose of the vector $C(kT)$

According to particular features, the module for calculating antenna steering coefficients implements a gradient or least error squares method to determine new values for steering coefficients.

According to particular features, the module for calculating antenna steering coefficients performs a matrix calculation:

$$C(kT+T) = C(kT) + \delta \cdot e(kT)^* \cdot X(kT)$$

in which formula the value of $\delta$ depends on the Eigen values of the self-correlation matrix of the received signal and is less than the inverse of twice the greatest Eigen value.

According to particular features, the module for calculating antenna steering coefficients comprises a buffer memory, adapted to store received data, and a means for synchronizing data read from said buffer memory and repeated data received by said antenna.

According to particular features, said buffer memory is adapted to store non-descrambled data. Their spectral data is thus kept.

According to particular features, the module for calculating antenna steering coefficients comprises a coder corresponding to a decoder adapted to decode the data received in the signals received by said antenna.

According to particular features, the repetition detection module employs a frame identifier to detect a frame repetition.

According to particular features, the antenna is adapted to access a communication network through TDM (acronym for Time Division Multiplex) access.

According to a second aspect, the present invention concerns a method of beamforming antenna steering, characterized in that it comprises:
    a first step of receiving a payload sequence,
    a second step of receiving said payload sequence,
    a step of detecting repetition of reception of said payload sequence and
    a step of determining steering coefficients on the basis of the signals received during the first and second steps of receiving said payload sequence.

As the particular objects and features of this method are similar to those of the device of the present invention, as succinctly set forth above, they are not reviewed here.

Figure 2:
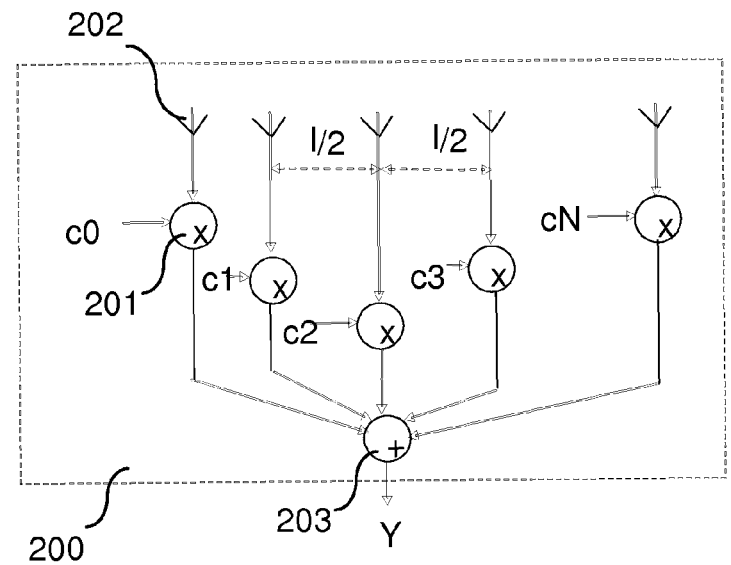
Figure 3:
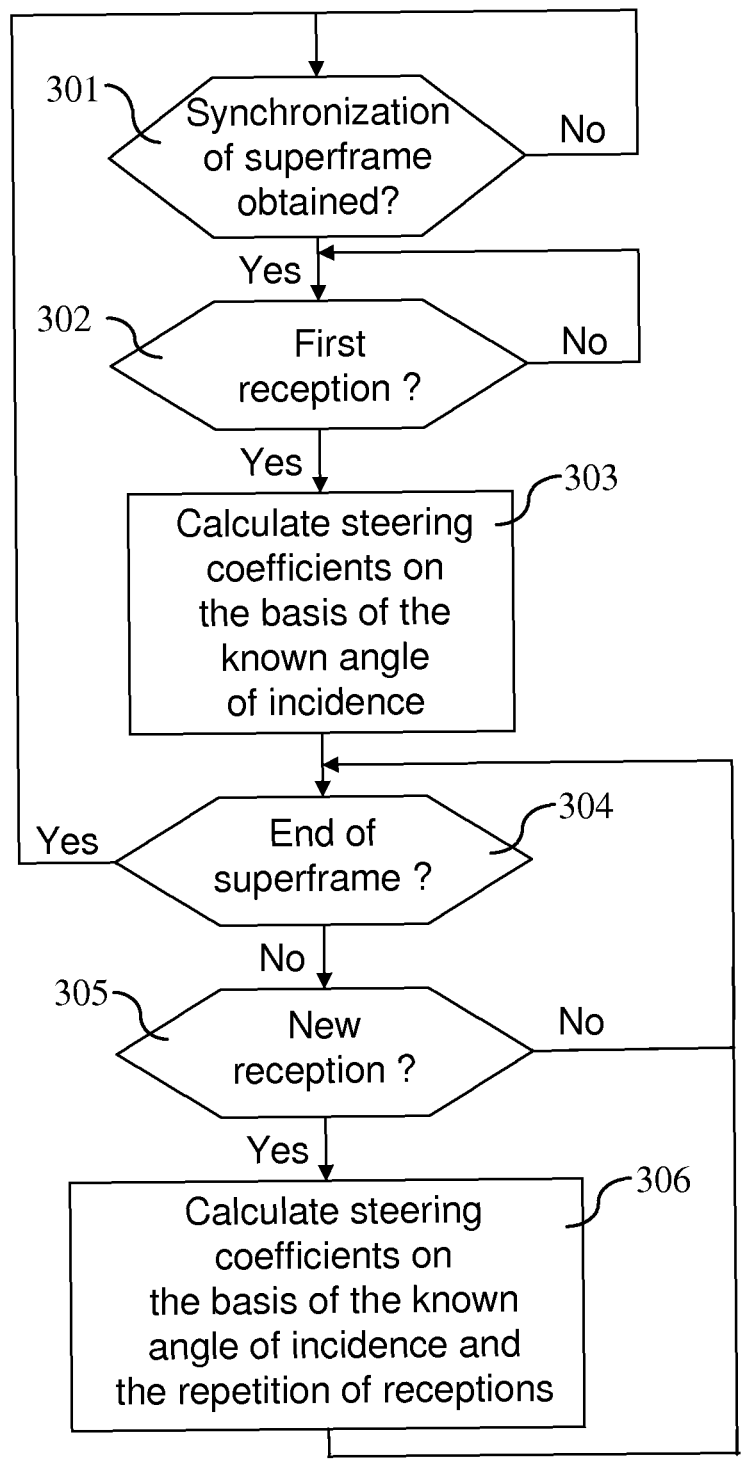
Figure 4:
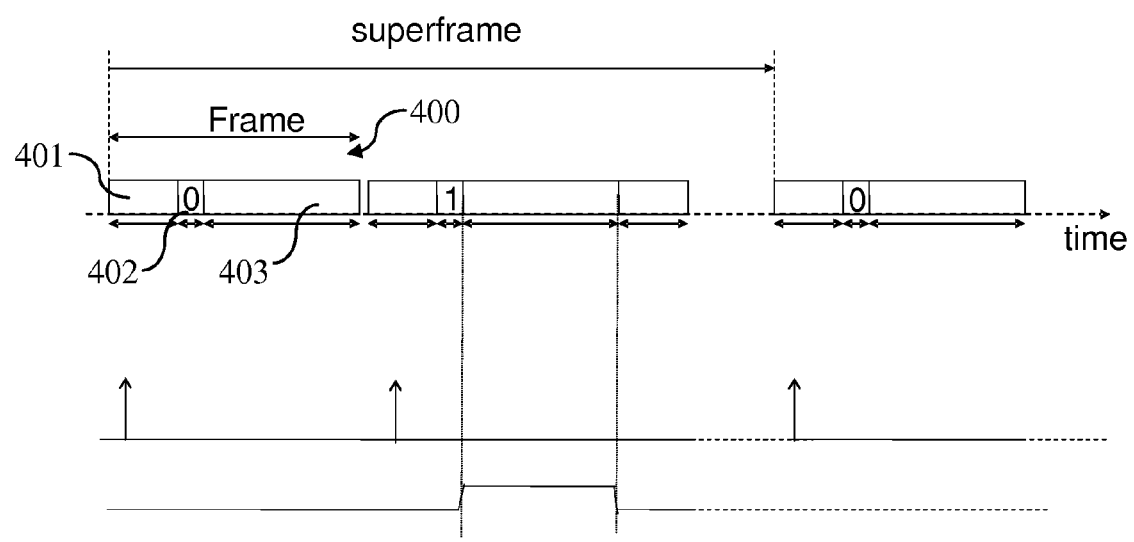
Figure 5:
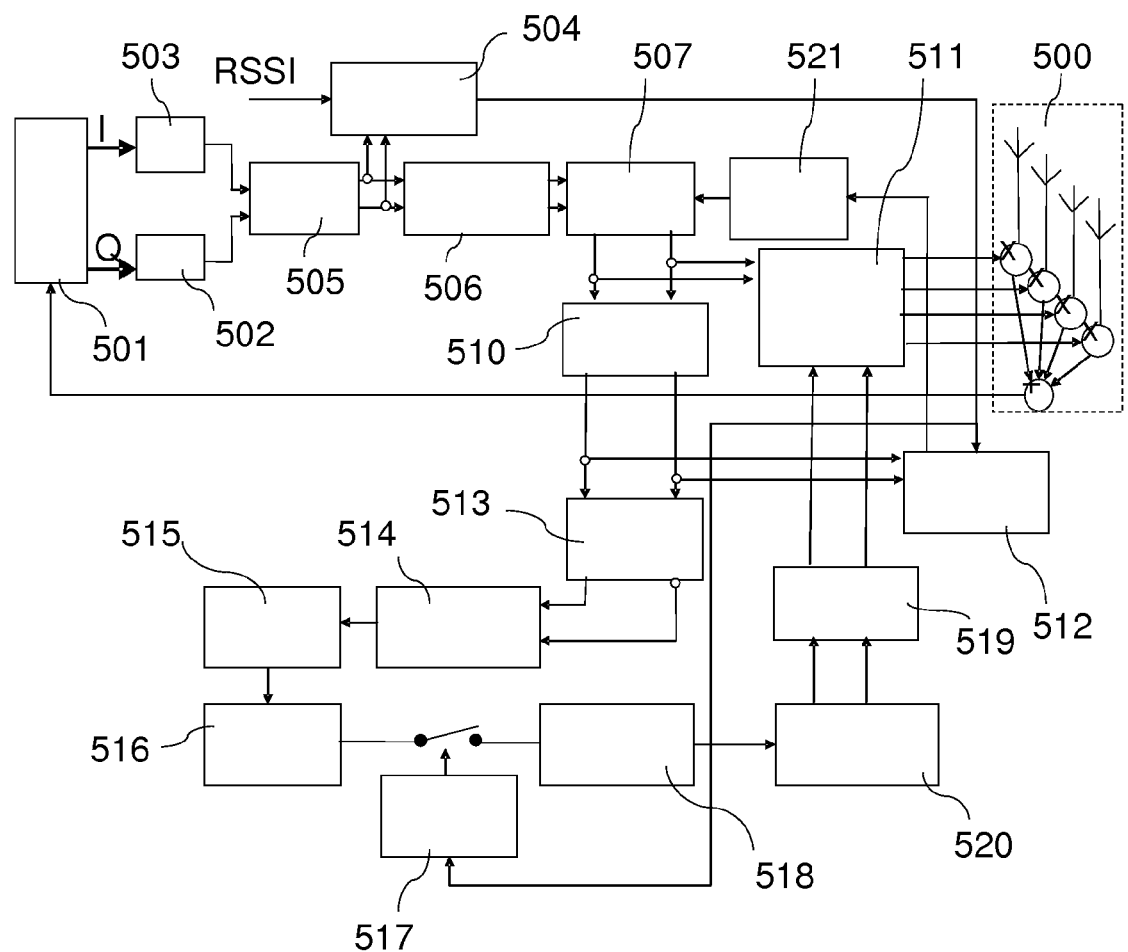

Other particular advantages, objects and features of the present invention will emerge from the following description, given, with an explanatory purpose that is in no way limiting, with reference to the accompanying drawings, in which:

FIG. 1 is a diagram of a mesh network to which the present invention may apply, FIG. 2 is a diagram of a beamforming antenna, FIG. 3 represents, in flow-diagram form, steps implemented in a particular embodiment of the method of the present invention, FIG. 4 is a diagram of access to the medium and of synchronization module signals and FIG. 5 is a diagram of a particular embodiment of the device of the present invention.

In the following description, which is non-limiting, the particular embodiment of the method and of the device of the present invention implements OFDM modulation. The reader may refer to the document by J. Heiskala, J. Terry "OFDM wireless Lans: A theoretical and Practical guide" SAMS Publishing 2002 for a better understanding of this type of modulation.

FIG. 1 has already been described during the discussion of the state of the art.

The steering method is described with reference to FIG. 2, by way of reminder, with the choice of the steering method based on a gradient algorithm or least error squares minimizing algorithm. In a beamforming antenna 200, radiating elements 202, or antenna elements, are disposed spaced apart from each other. Each circuit 201, associated with an element 202, performs the complex multiplication of a complex coefficient, referred to as "steering" coefficient, with the received signal. The various antenna signals, modulated in terms of phase and amplitude by that complex multiplication, are added by an adder 203 before being exploited.

It can easily be understood that a signal coming from a different direction than the normal arrives with a temporal offset as well as with a different attenuation at each antenna element. The right choice of steering coefficients makes it possible to re-align the various signals, that is to say put them back in phase and thus obtain greater energy at the output of the adder 203. Conversely, a judicious choice of steering coefficients makes it possible to attenuate, or even cancel out, the energy coming from parasitic sources or reflections. As the process is linear, it is possible to improve the ratio of signal to interference for a chosen direction. By analogy, it is considered that the beam is formed to obtain the best antenna gain, even though the antenna elements 202 are only passive elements.

It is to be noted that there are several ways to produce such beamforming antennae 200. In some, phase-shifter circuits and frequency switches for the antennae are used. In others, one or more drops in frequency are made (sub-carrier demodulation) and lags are produced by independent attenuators on the parts in phase and in phase quadrature. In still other ways, each signal coming from an antenna element is digitized, and complex multiplications are performed on the digitized signals. These techniques may be combined.

FIG. 3 represents a flowchart of steps of a particular embodiment of the method, that are implemented at the receiver. In this flowchart, it is assumed that the frame repetitions take place in the same super-frame. The present invention is not limited to this case, but extends, quite to the contrary, to all the cases of message repetitions.

Initially, the receiver awaits synchronization. This synchronization is obtained during a step 301. Next, the start of a first reception of a frame is detected during a step 302. During a step 303, the receiver uses the known steering angle and the synchronization information to refine the steering of the antenna towards a predetermined transmitter. This transmitter is, in particular, known on the basis of the distribution of the transmission intervals between the transmitters in the case of TDM access.

The initial steering angles are known to the receivers. By way of non-limiting example, the process for determining the initial steering angles is the following: the network topology is noted by the user and the user enters these data, prior establishing communication, in each node with the aid of a man-machine interface (not represented).

It may be noted that the receiver is not obliged to receive the frame "0" to synchronize itself. It suffices for it to receive one or more frames several times. Provided it knows their transmission orders indicated in the frame number field, since the access time is strictly defined (condition obtained with a TDM access, for example), the receiver may evaluate the time at which the superframe commences.

During a step 304, the receiver determines whether it has detected a superframe end. In the same way as previously, this detection is deduced from the synchronization. In case of superframe end detection, step 301 is returned to.

Otherwise, during a step 305, it is determined whether a new received frame is a repetition of a frame already received previously. To that end, it employs, for example, a frame identifier, for example a frame number. If the result of step 305 is negative, step 304 is returned to. If yes, during a step 306, the receiver uses the predetermined steering angle (that is to say the current steering coefficients) and the repeated data sequence to adjust the steering coefficients of the antenna as described later, for example by implementing a gradient or least error squares minimization method.

FIG. 4 represents a logic chain of the information on the network. By way of non-limiting example, the network here operates with TDM access. A frame 400 contains a header 401, a frame number 402 which indicates the position of the frame in the superframe and the node of the network from which it comes, as well as data 403. Each frame is sent by a node at a predetermined time. In this non-limiting example, the nodes 0 and 1 have already received the same message and retransmit it in the same superframe, which explains the value of the fields 402. In another embodiment, the retransmission could, for example, be carried out alternately in a superframe subsequent to the transmission superframe.

The synchronized receiver thus knows the time at which the data are presented. The header 401 contains the information necessary for the synchronization carried out during steps 302 and 305. For example, for the case of OFDM, a temporal sequence with high self-correlation makes it possible to create a synchronization signal at the receiver, even in the presence of high noise power. The particularity of the mesh network is that a message may be relayed, either to reach a node which is too far to receive the message from the source node, or for reasons of protection against packet losses, as set out with reference to FIG. 1. The nodes which are close to the source node and to the relay node receive repetitions of messages. In TDM access, the speaking order of the nodes is defined, thus as soon as a receiver has been synchronized it can determine whether the data it is receiving at a particular time are new elements, or form part of a repetition.

The antenna steering device described in FIG. 5 is an OFDM receiver with a beamforming antenna 200 described with reference to FIG. 2, provided with additional means for implementing an embodiment of the antenna steering method of the present invention. The waves arrive on the antenna 500. An module 511 for calculating the coefficients of the antenna 500 determines the beamforming of the antenna 500. The output from the antenna 500 enters a radio module 501 which puts the analog signal into a form which may be accepted by analog converters 502 and 503. More particularly, the radio module 501 performs demodulation for reducing frequency and creating I signals (I for "in phase") and Q signals (Q for in phase quadrature) for the reconstruction of the base band analytical signal. Operations of filtering and gain control (not represented) are carried out in accordance with the state of the art. The I and Q streams may next be filtered, or even decimated, by the circuit 505. At the output of circuit 505, each sample corresponds to an amplitude state of the OFDM signal. A synchronization detector 504 extracts a synchronization signal from the header information of the frame. A RSSI signal 508 is issued from the radio module 501 and indicates the presence of energy.

A redundant cyclic prefix which enables a transition between OFDM symbols limiting interference between symbols is eliminated from the signal coming from the circuit 505, by the circuit 506. The frequency error which arises from the differences between transposition modulating subcarriers of the transmitter and transposition demodulating subcarriers of the receiver is next eliminated by a circuit 507. A Fast Fourier Transform, performed by a circuit 510, makes it possible to retrieve, subcarrier by subcarrier, the baseband signals. These baseband signals are equalized by a circuit 513, then demodulated by a circuit 514.

A decoder 515, here a Viterbi decoder decoding a convolutional code, enables the correction of certain errors. A descrambler 522 enables the original data stream to be restored to the upper layers of the node. The analysis, by the circuit 512, of the pilots, which are subcarriers modulated by a temporal sequence of data known to the receiver, makes it possible to evaluate the deviations introduced by the channel, as equal to the frequency deviation. This frequency deviation is corrected by the circuit 507.

It should be remembered here that, to correct the errors linked to the transmission, a part of the sub-carriers transmitted in the symbols containing the data are predefined. They make it possible to correct mainly the errors inherent to the differences in frequency between the sender device and the receiver device. In a conventional manner, these sub-carriers are named "pilots" and represent a small percentage of all the sub-carriers. These pilots may nevertheless partially contribute to correcting the channel throughout the reception of the frame.

The elements described above form a conventional OFDM decoder. For the implementation of the present invention, the following elements are provided in complement. A buffer memory 516 stores the last frame received. It is noted that the sequence is not, in buffer memory 516, descrambled, in order to keep its spectral characteristics. This buffer memory 516 is formed for example with a shift register. A synchronization module 517 authorizes the shifting of the data stored to a convolutional coder 518 corresponding to the decoder 515. The shifted data arrive when the data present at the output of the synchronization module 507 match the sequence received previously. The reconstructed data are present at the steering module when the data present at the output of the synchronization module 507 match a sequence received previously. In the frame 400, the header 401 contains information necessary for the detection by the module 504. On reception of this synchronization, account must be taken of the propagation of the signal received in the modules 506, 507 and 511 as well as the propagation of the reconstructed signal in the modules 518, 520, 519, and 511. Thus the synchronization module 517 takes into account the times for passing through the modules (which are constant) and knows the start of the frames by the signal it receives from the detector 504. Module 517 thus knows the reception order (in a TDM system, the order of presentation of the data may be predefined and known to all the nodes) and is thus capable of determining whether the data received is a repetition. The outputs from the coder 518 are modulated by a modulation circuit 520, then converted into transposed band by the inverse Fourier transform, by a circuit 519.

It is remarkable that these last elements are, in fact, present in an OFDM transmitter. Their implementation is thus in no way costly if the chosen operating mode is semi-duplex. The output of the inverse Fourier transform from the circuit 519 is entered into the antenna steering module 511.

As regards the antenna steering calculation, let $C(kT)$ be the steering vector of the antenna at time kT. $C(kT)=(C0(kT), C1(kT) \ldots CN(kT))$ if the antenna has N+1 elements, $Cl(kT)$ being the complex coefficients applied to the signals from the antennae. Let $d(kT)$ be the signal vector coming from the Inverse Fourier Transform at time kT. Let $X(kT)$ be the vector representing the signal arriving on the antenna elements. An error signal vector $e(kT)$ is then constructed: $e(kT)=d(kT)-C^H(kT)X(kT)$ in which formula "$H$" indicates the Hilbertian transpose of the vector.

The gradient method, or method of minimization of the least error squares, makes it possible to calculate $C(kT+T)$. In equivalent manner, a matrix calculation is performed:

$$C(kT+T)=C(kT)+\delta \cdot e(kT)^* \cdot X(kT)$$

in which formula the value of $\delta$ depends on the Eigen values of the self-correlation matrix of the received signal and is less than the inverse of twice the greatest Eigen value. The choice of $\delta$ is a compromise between speed of convergence and precision of the convergence. On repetition of a long sequence, a small value of $\delta$ can be chosen.

As regards the initial antenna steering calculation, the Godara method is for example used, which is described in the document by F. Gross, "Smart Antennas for Wireless Communications", McGraw-Hill 2005, pages 212 to 231.

If the vector A is defined as being the vector of the array of elementary antennae, it is sought to achieve the following condition $C^H \cdot A = U$; in which U is a vector giving precedence to one direction and trying to cancel the other directions. It is known that an array of antennae constituted by N antennae cannot have more than N null lobes.

Thus $C^H = U^H \cdot A^H \cdot (A \cdot A^H + \sigma I) - 1$; where $\sigma$ is the average of an added noise vector since the inversion of $A \cdot A^H$ is singular.

In the light of the description, it is understood that the adaptive device described is advantageous. The choice of the initial direction suffers from the symmetry of the problem, and although the incident angle may be known, the angles of reflections are not necessarily known since the environment may modify them. The initial calculation does not enable the lobe cancelations to be adjusted. The device described takes into account the supplies of parasitic energy and creates an optimum antenna lobe for the desired direction by cancelling the undesired directions.

The invention claimed is:

1. A steering device for a beamforming antenna, the steering device comprising a gradient or least error squares algorithm module constructed to calculate antenna steering coefficients by implementing a gradient or least error squares method, and a frame identifier detector constructed to detect a repetition of a sequence of payload data in a signal received by the antenna by determining whether a received frame is a repetition of a frame already received, wherein the gradient or least error squares algorithm module for calculating antenna steering coefficients is constructed to perform an initial calculation based on payload data initially received and to adjust the initially calculated antenna coefficients by implementing the gradient or least error squares method on the basis of the initially received payload data and the repeated payload data.

2. A device according to claim 1, further comprising a wireless receiver implementing orthogonal frequency division multiplexing making it possible to have a plurality of sub-carriers.

3. A device according to claim 2, wherein the gradient or least error squares algorithm module for calculating antenna steering coefficients takes into account each sub-carrier of the signal received by the antenna.

4. A device according to claim 3, wherein the gradient or least error squares algorithm module for calculating antenna steering coefficients determines an inverse Fourier transform, in the form of a vector d(kT), of the current steering coefficients forming a vector C(kT) and determines an error signal e(kT) according to the vector formula:

$$e(kT)=d(kT)-CH(kT)X(kT)$$

where CH(kT) indicates the Hilbertian transpose of the vector C(kT) and X(kT) is the vector representing the signal arriving on the antenna elements.

5. A device according to claim 4, wherein the gradient or least error squares algorithm module for calculating antenna steering coefficients performs a matrix calculation:

$$C(kT+T)=C(kT)+\delta \cdot e(kT)^* \cdot X(kT)$$

in which formula the value of δ depends on the Eigen values of the self-correlation matrix of the received signal and is less than the inverse of twice the greatest Eigen value.

6. A device according to claim 1, wherein the gradient or least error squares algorithm module for calculating antenna steering coefficients comprises a buffer memory, adapted to store received data, and a means for synchronizing data read from the buffer memory and repeated data received by the antenna.

7. A device according to claim 6, wherein the buffer memory is adapted to store non-descrambled data.

8. A device according to claim 1, wherein the gradient or least error squares algorithm module for calculating antenna steering coefficients comprises a coder corresponding to a decoder adapted to decode the data received in the signals received by the antenna.

9. A device according to claim 1, wherein the repetition detection module employs a frame identifier to detect a frame repetition.

10. A device according to claim 1, wherein the antenna is adapted to access a communication network through TDM (Time Division Multiplex) access.

11. A method of steering a beamforming antenna, the method comprising:
 a first step of receiving a first payload sequence;
 a second step of receiving a second payload sequence, wherein the second payload sequence is a repeat of the first payload sequence;
 a step of detecting repetition of reception of the first and second payload sequences by determining whether a received frame is a repetition of a frame already received; and
 a step of performing a calculation of steering coefficients on the basis of signals received during the first and second steps of receiving the first and second payload sequences by implementing a gradient or least error squares method,
 wherein an initial calculation of antenna coefficients is performed based on the first payload sequence, and the initially calculated antenna coefficients are adjusted by implementing the gradient or least error squares method on the basis of the first payload sequence and the second payload sequence.

12. A method according to claim 11, wherein the steps of receiving include wirelessly receiving an orthogonal frequency division multiplexing signal received by the antenna, the signal having a plurality of sub-carriers, wherein the step of calculating antenna steering coefficients takes into account each sub-carrier of the signal.

13. A method according to claim 12, wherein the step of calculating antenna steering coefficients determines an inverse Fourier transform, in the form of a vector d(kT), of the current steering coefficients forming a vector C(kT) and determines an error signal e(kT) according to the vector formula:

$$e(kT)=d(kT)-CH(kT)X(kT)$$

where CH(kT) indicates the Hilbertian transpose of the vector C(kT) and X(kT) is the vector representing the signal arriving on the antenna elements.

14. A method according to claim 13, wherein the step of calculating antenna steering coefficients performs a matrix calculation:

$$C(kT+T)=C(kT)+\delta \cdot e(kT)^* \cdot X(kT)$$

in which formula the value of δ depends on the Eigen values of the self-correlation matrix of the received signal and is less than the inverse of twice the greatest Eigen value.

15. A method according to claim 11, wherein the step of calculating antenna steering coefficients comprises storing received data in a buffer memory, and synchronizing data read from the buffer memory and repeated data received by the antenna.

16. A method according to claim 15, wherein during the step of storing received data in the buffer memory, non-descrambled data is stored.

17. A method according to claim 11, wherein the repetition detection step uses frame identifying to detect a frame repetition.

18. A method according to claim 11, wherein, during the steps of receiving, the antenna accesses a communication network through TDM (Time Division Multiplex) access.

* * * * *